United States Patent [19]

Dikman

[11] 4,027,780

[45] June 7, 1977

[54] PAPER THROWER

[76] Inventor: Robert J. Dikman, 1811 1/2 Shore Drive South, South Pasadena, Fla. 33707

[22] Filed: Aug. 1, 1975

[21] Appl. No.: 601,084

[52] U.S. Cl. .................................. 221/7; 221/13; 221/259; 235/151.2; 235/150.2
[51] Int. Cl.² ........................................ G06F 15/50
[58] Field of Search ............... 221/1, 2, 7, 8, 9, 13, 221/120, 124, 129, 231, 233, 234, 236, 259; 235/151.2, 150.2, 151.27; 340/24

[56] References Cited

UNITED STATES PATENTS

| 3,653,538 | 4/1972 | Lamar | 221/1 |
|---|---|---|---|
| 3,749,893 | 7/1973 | Hileman | 340/24 |
| 3,845,289 | 10/1974 | French | 340/24 |

*Primary Examiner*—Robert B. Reeves
*Assistant Examiner*—H. Grant Skaggs
*Attorney, Agent, or Firm*—Duckworth, Hobby, Orman, Allen & Pettis

[57] ABSTRACT

This invention relates to a delivery system designed to be used in combination with a selfpropelled mobile platform such as a truck or like vehicle wherein the system is designed to deliver newspapers or such articles to residences along a predetermined route. One or more conveyor assemblies are movably mounted on the supporting bed of the mobile platform wherein delivery assemblies, which may be of conventional design, are disposed in communicating relation with the conveyor such that the conveyors and respective delivery assemblies are activated so as to expel a paper to a predetermined residence or location upon activation of the delivery system drive assembly. A control device is interconnected to activate the drive assembly upon receiving precoded information or signals from logic circuitry interconnected to the driving assembly of the platform, whereby the distance travelled by the platform is automatically converted into command signals to operate the conveyor and delivery element associated therewith.

7 Claims, 5 Drawing Figures

PAPER THROWER

BACKGROUND OF THE INVENTION

1. Field of the Invention

This invention relates to an automatically controlled and operated conveyor system designed to be used in combination with a mobile platform wherein objects are delivered from a conveyor system on a periodic basis dependent upon the distance travelled by the mobile platform. 2. Description of the Prior Art In the newspaper industry, delivery of newspapers to residential locations has been accomplished by manual delivery for many years. With the advent of modern society, such manual delivery has become increasingly inefficient and costly. Conventional paper route delivery service has become obsolete in all but suburban and rural residential areas, where conventional paper routes and manual delivery still predominates. However, due to the constantly increasing population, such delivery systems have become more expensive, more time consuming and, as set forth above, less efficient.

For years, the newspaper industry has been searching for a means of facilitating paper delivery utilizing mechanized means. However, there are obviously inherent problems which previously have been considered to be adequately solved only by manual delivery. The use of vehicles themselves wherein delivery personnel physically throw or deliver the paper from the vehicle to the designated location have been utilized for some time.

Naturally, attempts have been made to incorporate some type of automated system utilizing conveyors for automatically delivering and transporting the papers to the various residences. Generally, however, such systems have failed to meet all of the performance requirements required for the delivery of a plurality of papers to a plurality of different residences located in a somewhat random relationship to one another.

There are in existence, conventional computer operated or logic controlled conveyor systems capable of intermittent or precontrolled operation. The state of art of said precontrolled conveyor systems are represented in the U.S. Pat. Nos. to Reed 3,383,011 and Gray 3,482,260. However, while functional and operative, such systems are not generally capable of the versitility and also of the mobile performance characteristics required by today's paper delivery system generally set forth above.

Accordingly, there is an obvious need in the paper industry for a delivery system having sufficient versitility and mobility to accurately and reliably deliver one or more papers to essentially randomly located residential locations or delivery stations.

SUMMARY OF THE INVENTION

This invention relates to a delivery system designed to be used in combination with a mobile platform such as a self-propelled vehicle. The system is particularly intended for use for the delivery of newspapers or the like to various delivery stations such as residences randomly located relative to one another along a predetermined route or path of travel.

More particularly, a carrying means in the form of one or more conveyor assemblies is mounted on a support platform of a truck. Delivery means including at least one delivery assembly is disposed in paper receiving position relative to each conveyor means. The delivery means may comprise a substantially conventional structure which is capable of propelling objects of predetermined dimensions and configurations from the supporting bed of the truck over a predetermined range of distances.

While a variety of conventional delivery assemblies may be utilized, a preferred embodiment of the present invention comprises the utilizing of a pair of opposing wheels or discs arranged in spaced relation to one another and in receiving position relative to a drop chute disposed in direct communication with each of the conveyor assemblies. The delivery assemblies may be run on periodic command basis or continuously wherein selective, controlled delivery of the papers to the delivery system regulates the delivery of the papers from the platform.

A carrier drive means is interconnected in driving relation to each of the carrier assemblies utilized. A central control means is electrically interconnected between the drive assembly of the platform itself and drive means of the conveyor assembly. Similarly, the control means may be interconnected in controlling or actuating relation to delivery drive means connected to each of the delivery assemblies in driving relation thereto.

The control means itself comprises logic means wherein predetermined reference information is stored in the form of distance and location data concerning the delivery station for residences defining each point of delivery of the various papers. The distance and location data are defined in terms of the path of travel of the truck as it travels down the various streets which determine the route or ultimate predetermined path of travel of the vehicle. The control means further comprises counter means receiving pulses from an encoder means which is directly attached to the drive assembly of the vehicle. The counter means receives the various pulses, translates this information into a predetermined reference code and in turn transmits through adequate circuitry, resulting signals or pulses to a comparator means which is also part of the control means.

The comparator means receives input from both the logic means or more particularly the information storage facility of the logic means. The information received is in the form of the distance and location reference data locating the various delivery stations on the route. Again, the comparator means further receives the information from the counter means in terms of how far the vehicle has travelled along the determined route. The comparator compares the two and sends, through proper circuitry, a command signal to the carrier drive means and/or the delivery drive means. Proper interaction between the conveyors and delivery means serves to deliver the paper to the proper delivery station or residence.

Proper indicator means may be mounted on the vehicle in communicating relation to the operator or driver of the vehicle so as to indicate various conditions of the delivery system. Such conditions include proper location, proper operation of the various conveyor assemblies and delivery assemblies, proper number of papers delivered, actuality of papers delivered, proper location of the vehicle and any other desirable operating characteristics needed for the efficient and practical operation of both the vehicle and the system itself.

Bu way of explanation, and not by way of limitation, the operation of the subject delivery system will be explained hereinafter which specific reference to an applicable control means and logic means which is a part thereof. The rotation or physical movement of the drive assembly of the mobile platform will be translated into digital pulses by a transparent wheel, with an opaque slit between an LED and a light sensitive, photoresistor-type element. These digital pulses are counted by counter means which decodes the pulses into distance information. A paper tape reader or like device comprising the information storage facilities of the logic means, inputs each "address of delivery" in a two character block. Each new block is not read until the previous block has been acted upon. The block information is formulated such that the first eight character word contains the eight LSB of the distance code and the second word contains the next five bits of the distance code, two bits of the left/right information and pre-bit for numbers of papers indicated. Proper left/right code can be utilized when a plurality of conveyors are mounted on the mobile platform so as to deliver from each side thereof. An input-output interface catagorizes the sixteen bit block into distance code, left/right code and greater than one paper code after it converts the binary serial information to parallel information. The distance code from the logic means and the information from the counter means is fed to the comparator means, as set forth above, which then, through proper circuitry, sends the proper command signal to the various drive assemblies of the conveyor and delivery assemblies.

When the comparator means detects that the required distance has been travelled, from input from the encoder means, the delivery drive means is allowed to eject a paper. As the paper leaves the chute, a switch is activated which tells the system that the paper was in fact delivered. If a paper does not leave within the predetermined time, the operator will be informed through proper indicator means as set forth above. At this point, the paper may be manually ejected or alternately, the entire system may be reset or other adequate means may be taken to either correct the system's operation, eject the proper number of papers or stop the entire system for repair.

The invention accordingly comprises the features of contruction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a top view of the carrying means, delivery means, various drive means and the control means all mounted on a mobile platform in the form of a self-propelled vehicle such as a truck or the like.

Similar reference characters refer to similar parts throughout the several views of the drawings.

DETAILED DESCRIPTION

Figure 1:
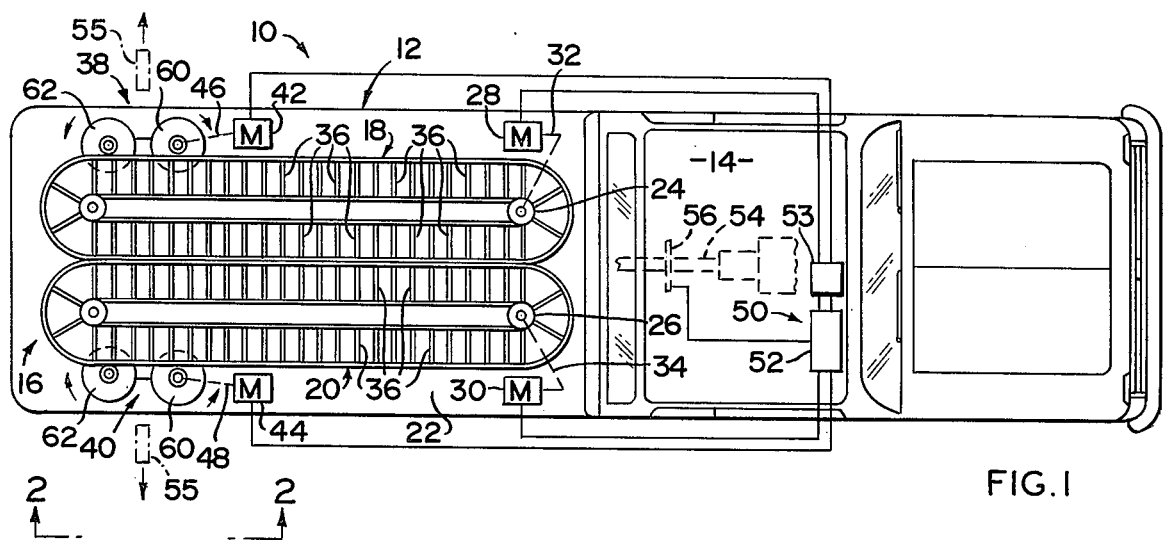

As represented in FIG. 1, the delivery system of the present invention is generally indicated as 10 and comprises a mobile platform 12 which may be self-propelled and which may be in the form of a flatbed truck or applicable vehicle. Accordingly an operator compartment generally indicated as 14 is disposed to house an operator in operative position to both the delivering system and the vehicle itself.

The delivery system comprises carrying means generally indicated as 16 in the form of one or more, but preferably at least two conveyors 18 and 20 disposed on the flatbed or supportive portion 22 of the vehicle or mobile platform 12. Each of the conveyor assemblies comprises, in the preferred embodiment, an endless conveyor system driven at power wheel 24 and 26 by appropriate carrier drive means 28 and 30 as shown. These drive means may be in the form of motors properly connected in driving relation to the drive wheels 24 and 26 respectively, through any type of appropriate linkage indicated in broken lines as 32 and 34 respectively.

Further structural features of each of the conveyor assemblies 18 and 20 comprises being made up of a plurality of compartments or pockets indicated as 36 on each conveyor assembly. Upon activation of the respective carrier means the individual pockets 36 are successively positioned relative to delivery means comprising delivery assemblies 38 and 40 associated with each of the conveyor assemblies 18 and 20 respectively. More particularly, the delivery assemblies 38 and 40 are activated by proper delivery drive means 42 and 44, also through proper linkage mechanism 46 and 48 respectively.

As will be explained in greater detail hereinafter, the delivery system further comprises a control means generally indicated as 50 which incorporates therein a logic system indicated in block form as 52. The control means and logic system or facilities 50 and 52 are interconnected between the drive assembly of the mobile platform or vehicle 54 and more specifically an encoder means 56 which serves to translate distance into electrical pulses, again, as will be explained hereinafter. Each of the carrier drive means 28, 30 and/or the delivery drive means 42, 44 may be interconnected to the control means and actuated thereby so as to cause proper delivery of the objects 55 (newspapers) from the delivery system in a manner which will become evident with specific explanation of the control means 50.

Figure 2:
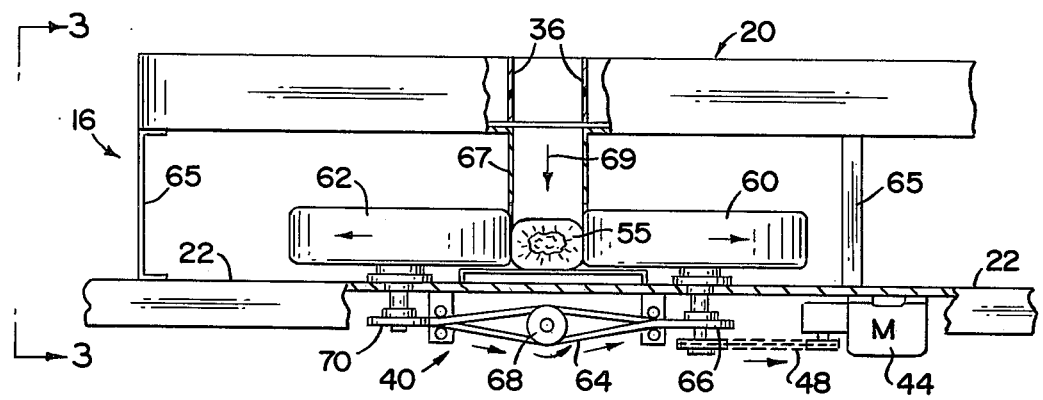
FIG. 2 is an end view taken along line 2—2 of FIG. 1 showing structural features and operation of a delivery assembly of the present invention.
Figure 3:
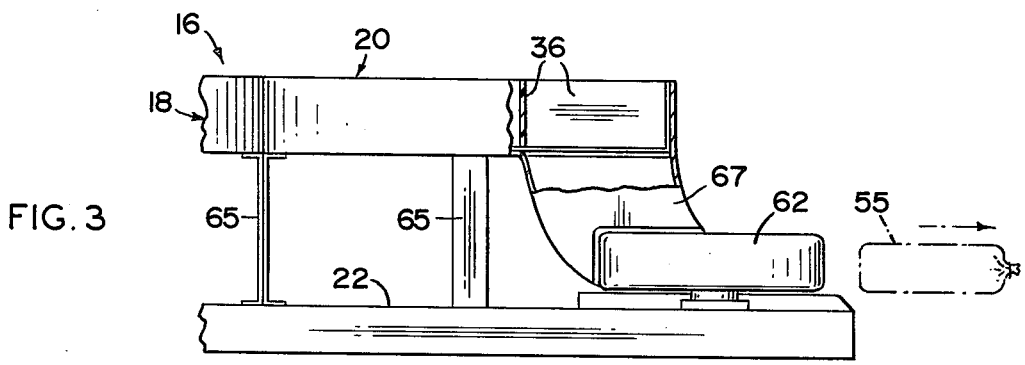
FIG. 3 is an end view taken along line 3—3 of FIG. 2 showing structural features of the embodiment of FIG. 2.
Figure 4:
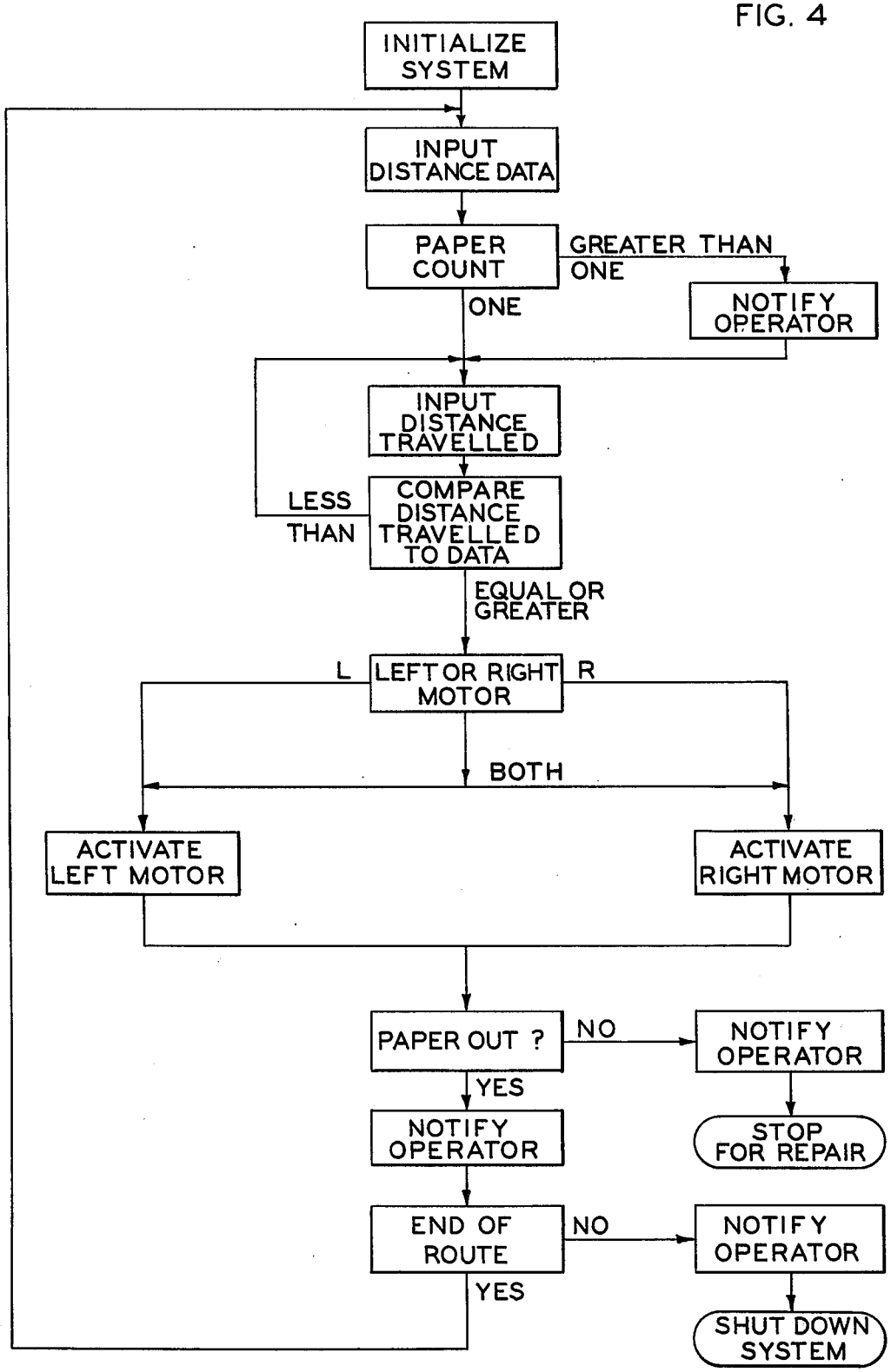
FIG. 4 is a block diagram showing the flow and generally disclosing the process and operation of the object delivery device as one or more papers are delivered to the predetermined delivery stations.
Figure 5:
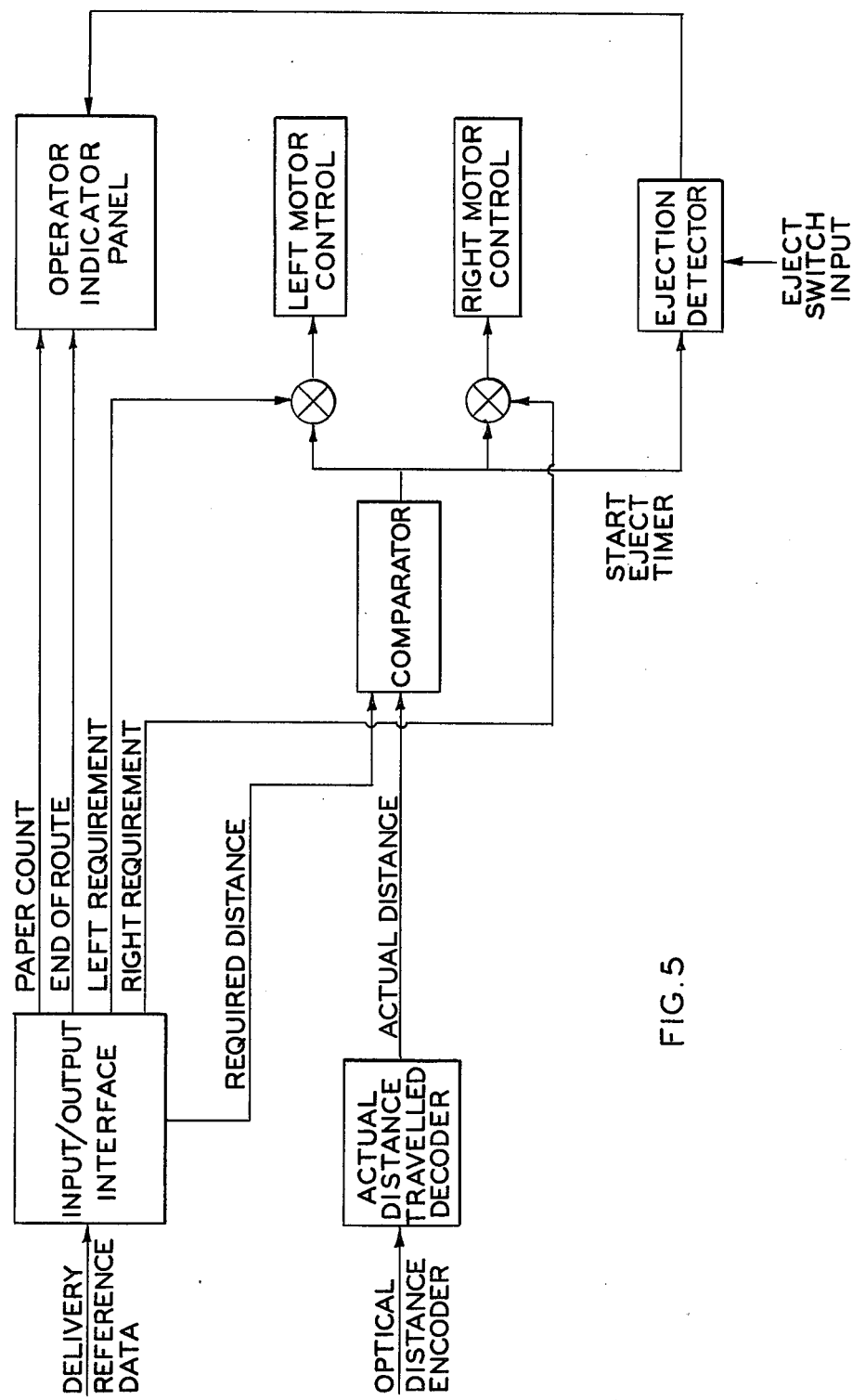
FIG. 5 represents one embodiment of the present invention showing applicable circuitry in schematic representation.

Turning to FIGS. 2 and 3 the specific structural details of the preferred embodiment of the delivery means 40 comprises oppositely rotating wheels or discs 60 and 62 which are powered from delivery drive means 44 through linkage 48 and specifically through a common drive belt arrangement 64 interconnected through drive pulley 66 and idler pulleys 68 and 70 as shown. The conveyor assembly 20 is mounted substantially above the delivery means 40 by support brackets 65 such that each of the compartments 36 are positionable periodically, in object delivering relation to a delivery or drop chute 67. The drop chute 67 is positioned in intercommunicating relation between the periodically positioned compartments 36 and the delivery discs 60 and 62 as shown both in FIGS. 2 and 3. Directional arrow 69 indicates path of travel of the object 54 as it travels from the compartment 36 through drop chute 67 into delivering position relative to the disc 60 and 62. At this point, it should be noted that the wheels 60 and 62 may be driven on a continuous basis by driving motor 44. Alternately wheels 60 and 62 may be selectively actuated by the control means 50 and logic assembly 52 in cooperation with the movement of the conveyor assemblies 20, dependent upon the distance travelled by the vehicle or mobile platform 12. Additionally, as shown in FIG. 1, the invention further includes indicator means 53 operatively connected to control means 50 and logic assembly 52. Indicator means 53 is visually observable by the operator to provide means for monitoring proper operation of the system. Functions monitored by indicator means 53 are indicated schematically in the chart of FIG. 4.

What is claimed is:

1. An object delivery system used in combination with a mobile supporting platform, said delivery system comprising: carrying means movably mounted on said mobile platform, said carrying means configured to carry a plurality of predetermined objects thereon; delivery means comprising at least one pair of opposing discs disposed in communicating relation to said carrying means; carrier drive means connected in driving relation to said carrying means; said mobile platform comprising a drive assembly connected thereto to receive power from a power source and disposed to drive said mobile platform and cause movement thereof; control means interconnected between said drive assembly of said mobile platform and said carrier drive means; encoder means mechanically attached to said drive assembly, said encoder means physically and electronically configured to translate mechanical movements of said drive assembly into electrical pulses, said encoder means being electrically connected in pulse-communicating relation to said control means; said control means comprising logic means including reference storage facility containing pre-stored reference information and comparator means electrically connected to said logic means, said comparator means connected in circuitry to said encoder means whereby said comparator means compares incoming data from both said encoder means and said storage facility; and indicator means mounted on said platform and electrically interconnected to said control means, said indicator means elelctrically configured for actuation upon signal response defined by a predetermined occurrence, whereby activation of said carrying means and said delivery means automatically occurs on a periodic basis dependent upon a predetermined length of travel of said drive assembly of said mobile platform and the resulting speed of operation of said drive assembly.

2. An object delivery system as in claim 1 further comprising delivery drive means connected in driving relation to said delivery means, said control means further interconnected between said delivery drive means and the drive assembly of said mobile platform, whereby periodic actuation of said delivery means occurs automatically, dependent upon predetermined length of travel of said mobile platform and resulting operation of the drive assembly thereof.

3. An object delivery system as in claim 1 wherein said delivery means is further disposed adjacent an outboard portion of said platform and an object receiving position relative to said carrier means, whereby objects are transported to said delivery means and expelled thereby from said platform.

4. An object system as in claim 1 wherein said carrying means comprises at least one conveyor assembly mounted on said mobile platform, said conveyor assembly disposed in object deliverying position relative to said delivery means.

5. An object delivery system as in claim 1 wherein said carrying means comprises a plurality of conveyor assemblies each mounted on said mobile platform, said delivery means comprising a plurality of delivery assemblies, each delivery assembly disposed in object receiving position to one of said conveyor assemblies, whereby can be concurrently delivered from said platform from each of said conveyor assemblies.

6. An object delivery system as in claim 1 wherein said logic means further comprises counter means delectronically interconnected to said encoder means and reference storage facility, said counter means including translation circuitry whereby input from said encoder means is translated into predetermined coded information.

7. An object delivery system as in claim 6 wherein said comparator means is electrically interconnected to both said counter means and said reference storage facility, said comparator means comprises: command circuity whereby command signals are sent to carrier drive means dependent upon a comparison between reference information and coded information from said comparator means.

* * * * *

UNITED STATES PATENT AND TRADEMARK OFFICE
CERTIFICATE OF CORRECTION

PATENT NO. : 4,027,780
DATED : June 7, 1977
INVENTOR(S) : Robert J. Dikman

It is certified that error appears in the above-identified patent and that said Letters Patent are hereby corrected as shown below:

Column 5, line 51, delete "elelctrically" and insert therefor --electrically--.

Column 6, line 38, delete "delectronically" and insert therefor --electronically--.

Signed and Sealed this

Twentieth Day of September 1977

[SEAL]

Attest:

RUTH C. MASON
Attesting Officer

LUTRELLE F. PARKER
Acting Commissioner of Patents and Trademarks